(12) United States Patent
Akula et al.

(10) Patent No.: US 12,093,716 B2
(45) Date of Patent: Sep. 17, 2024

(54) METHOD AND SYSTEM FOR DEPLOYING A PRODUCTION SYSTEM IN A VIRTUALIZED ENVIRONMENT

(71) Applicant: Hewlett Packard Enterprise Development LP, Houston, TX (US)

(72) Inventors: Surendra Babu Akula, Karnataka (IN); Murulikrishna Budhya Annajirao, Karnataka (IN); Krishna Chaitanya Battini, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 441 days.

(21) Appl. No.: 17/485,579

(22) Filed: Sep. 27, 2021

(65) Prior Publication Data
US 2022/0398118 A1 Dec. 15, 2022

(30) Foreign Application Priority Data
Jun. 15, 2021 (IN) .............................. 202141026718

(51) Int. Cl.
*G06F 9/455* (2018.01)
(52) U.S. Cl.
CPC .. *G06F 9/45558* (2013.01); *G06F 2009/4557* (2013.01); *G06F 2009/45591* (2013.01)
(58) Field of Classification Search
None
See application file for complete search history.

(56) References Cited

U.S. PATENT DOCUMENTS

| 8,782,241 | B2 | 7/2014 | Tung et al. |
| 8,997,088 | B2 | 3/2015 | Gurikar et al. |
| 9,172,624 | B1 | 10/2015 | Naik et al. |
| 9,813,318 | B2 | 11/2017 | Iyoob et al. |
| 10,931,552 | B1* | 2/2021 | Zhang ..................... H04L 43/50 |
| 2005/0144619 | A1* | 6/2005 | Newman .................. G06F 8/61 717/177 |

(Continued)

OTHER PUBLICATIONS

Automation Assurance Framework to Validate Cloud Readiness, (Research Paper), Mar. 2019, 8 Pgs.

*Primary Examiner* — Adam Lee
(74) *Attorney, Agent, or Firm* — Trop, Pruner & Hu, P.C.

(57) ABSTRACT

Example implementations relate to system and method of determining readiness of a datacenter environment for deploying a production system in a virtualized environment of the datacenter environment. The method includes receiving a parameter data of a device controller, and a first configuration data of computing devices from the device controller that manages deployment and configuration of the virtualization environment, and a second configuration data of networking switches. Further, the method includes validating the parameter data, and the first and second configuration data by comparing against a predetermined data required for deploying the production system. The method further includes performing connectivity test among the computing devices. Further, the method includes generating report having the parameter data, the first and second configuration data, results of the connectivity test, and one of an error information or a warning information based on results of validation, for deploying the production system by the device controller.

20 Claims, 5 Drawing Sheets

(56) References Cited

U.S. PATENT DOCUMENTS

| | | | |
|---|---|---|---|
| 2008/0143548 A1* | 6/2008 | Grimmelmann | G08B 25/006 379/202.01 |
| 2013/0219388 A1* | 8/2013 | Moeller | G06F 9/45558 718/1 |
| 2015/0149835 A1* | 5/2015 | Jayaraman | G06F 11/0751 714/48 |
| 2016/0162317 A1* | 6/2016 | Doherty | G06F 11/301 718/1 |
| 2016/0294772 A1* | 10/2016 | Padmanabhan | H04L 63/0263 |
| 2019/0229987 A1* | 7/2019 | Shelke | H04L 41/0813 |
| 2021/0014142 A1* | 1/2021 | Huang | H04L 43/10 |
| 2021/0409271 A1* | 12/2021 | Jacob Da Silva | H04L 41/0866 |
| 2022/0247641 A1* | 8/2022 | Stolz | H04L 41/12 |
| 2022/0247653 A1* | 8/2022 | Davies | H04L 41/0866 |

\* cited by examiner

METHOD AND SYSTEM FOR DEPLOYING A PRODUCTION SYSTEM IN A VIRTUALIZED ENVIRONMENT

BACKGROUND

A datacenter may include computing devices for hosting one or more workloads (application) of customer. An increased demand for datacenter services has resulted in increased complexity and size of datacenters. Virtualizing the computing devices in datacenters has simplified the operation of datacenter, scaled up the capacity of the datacenter to meet the increased demand, and reduced the size of the datacenter. For example, a virtualization software deployed on each computing device of the datacenter, may allow the corresponding computing device to be virtualized into one or more virtual machines. Thus, each virtual machine may function like a physical computing device having its own operating system for hosting the one or more workloads of the customer in the virtualized environment of the datacenter.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
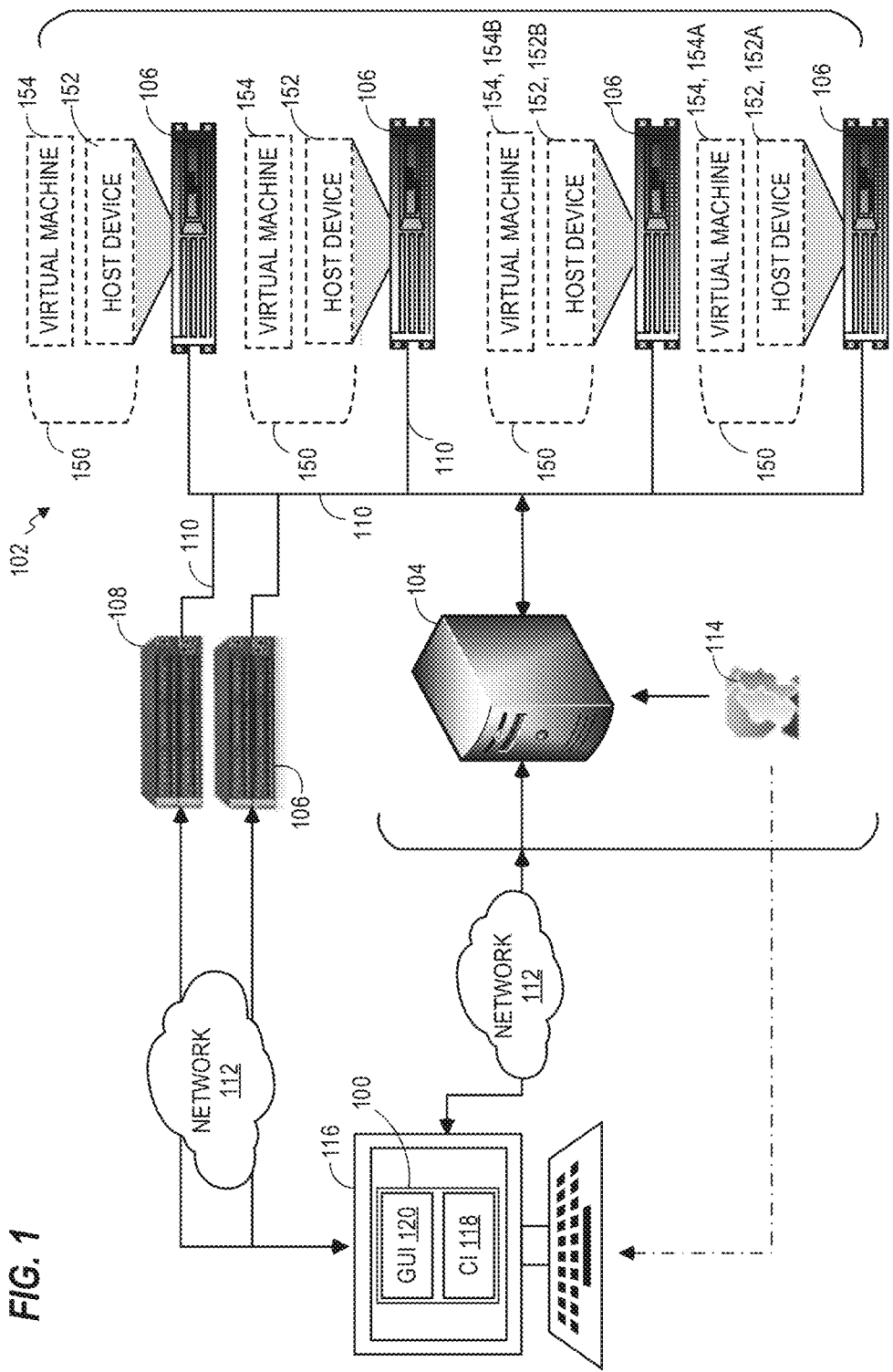
FIG. 1 is a block diagram depicting a readiness analyzer engine communicatively coupled to a datacenter environment and networking switches, in accordance with some examples of the present disclosure.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

As used herein, the term "production system" is a mission-critical system deployable in a virtualized environment of a datacenter environment that is configured such that a plurality of computing devices is clustered together using high-speed fabrics and integrated with a storage device and a plurality of networking switches. In other words, the term "mission-critical system" may be referred to a fault tolerant system that is configured to operate even when one or more of its components fail to operate, thus providing an interrupted production platform for hosting one or more workloads, such as a mission-critical workload (or application), or the like. Accordingly, the mission-critical system may use one or more backup components that may automatically take the place of one or more failed components, ensuring no loss of services provided by the mission-critical workload hosted on the mission-critical system.

As used herein the term "mission-critical workload" may refer to an uninterrupted production workload (that is made available by the mission-critical system) for seamlessly providing intended services to one or more users connected to the mission-critical workload. Examples of the mission-critical workload may include a stock market application, a navigational support application for a spacecraft, or the like.

As used herein the term "virtualized environment" may refer to a compute environment deployed on each of a plurality of computing devices of the datacenter environment, to enable creation of one or more virtual machines on a corresponding computing device, where each virtual machine may exist independently by using compute resources (physical resource) of the corresponding computing device. The virtualized environment may be deployed by implementing a virtualization software on each of the plurality of computing devices. As used herein, the term "device controller" may refer to a centralized management unit that is communicatively coupled to the plurality of computing devices for managing the process of deployment and configuration of the virtualization environment and/or the production system in the virtualized environment.

Figure 4:
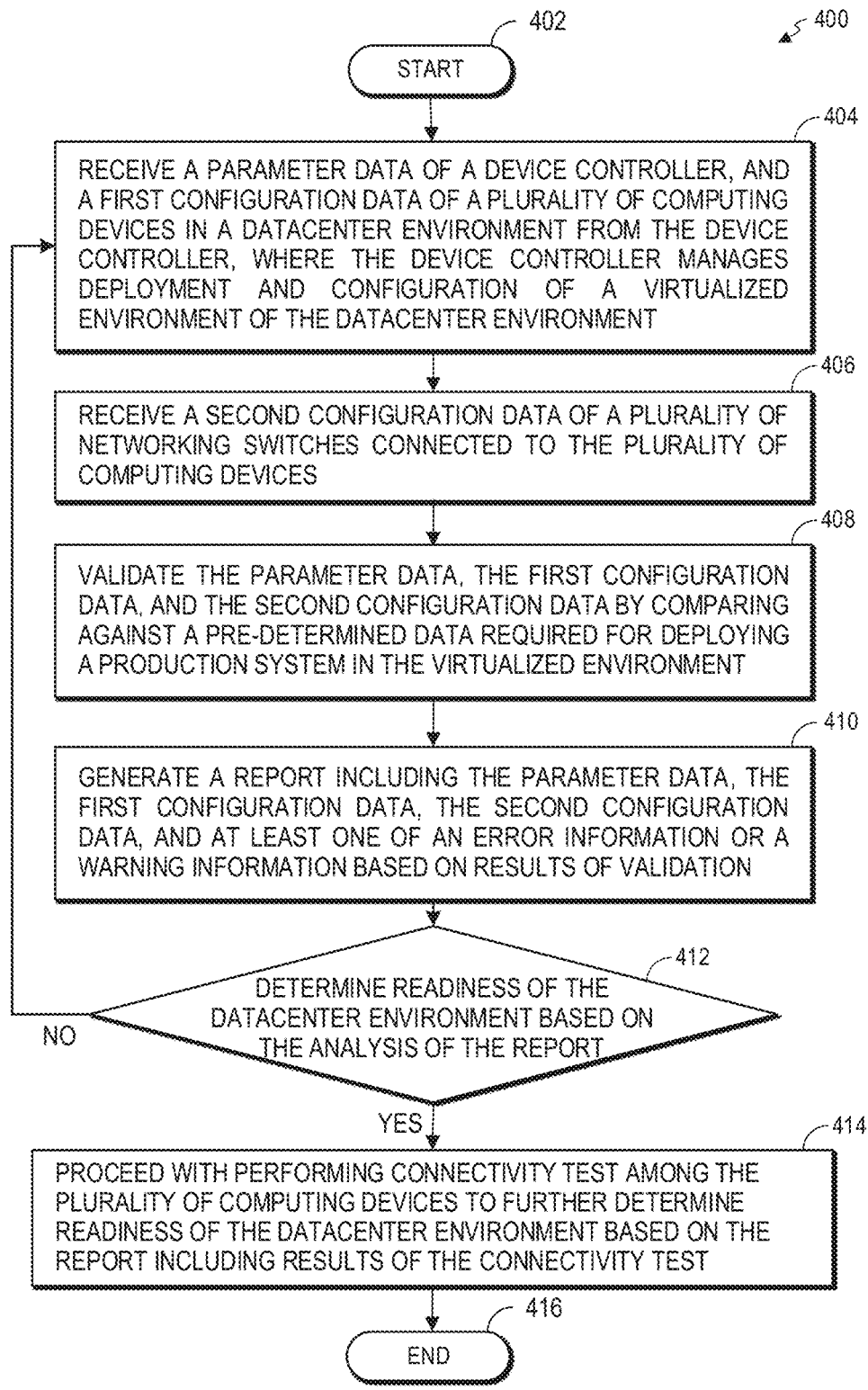
FIG. 4 is a flow diagram depicting a method for validating readiness of computing devices and networking switches for deploying a production system in a virtualized environment of a datacenter environment, in accordance with some examples of the present disclosure.
Figure 5:
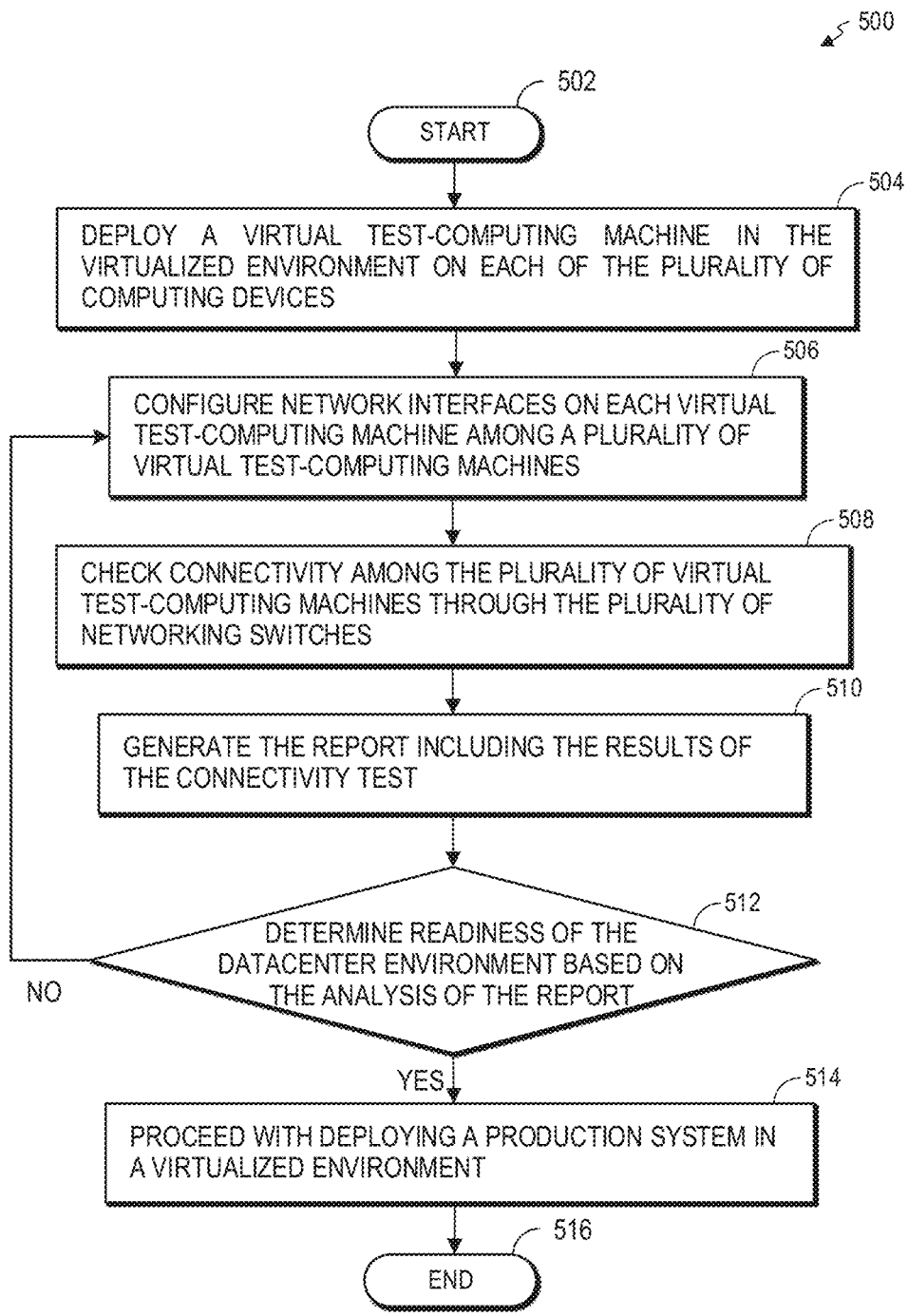
FIG. 5 is a flow diagram depicting a method for performing connectivity test among computing devices through networking switches for deploying a production system in a virtualized environment of a datacenter environment, in accordance with some examples of the present disclosure.

For purposes of explanation the present disclosure, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 1 and 4-5 is an example and is not intended to be limiting. Additional or fewer operations or combinations of operations may be used or may vary without departing from the scope of the disclosed examples. Thus, the present disclosure merely sets forth examples of implementations, and many variations and modifications may be made to the described examples. Such modifications and variations are intended to be included within the scope of this disclosure and protected by the following claims.

A datacenter environment includes a plurality of computing devices for hosting one or more workloads of customer. Due to increased demand for datacenter services over a period of time, the datacenter environment is virtualized in order to fulfil such increased demand, and also to reduce complexity and size of the datacenter environment. For example, a virtualization software, such as a hypervisor may be deployed on each of the plurality of computing devices to virtualize the datacenter environment into a virtualization environment. Further, one or more virtual machines may be created on the virtualization environment deployed on each computing device. The one or more virtual machines may be customized based on the customer's requirement for deploying a production system in the virtualized environment. In such examples, the production system may then host (or execute) the one or more workloads (or application) of the customer to meet service demand of the datacenter environment.

However, the datacenter environment may need to have certain required configurations that are imperative for deploying a particular type of production system, for example, a mission-critical system in the virtualized environment of the datacenter environment. The required configurations may include, for example, specific hardware, software or firmware versions, network, storage, connectivity among the computing systems via networking switches, or the like in order to make the mission-critical system highly available (e.g., fault tolerant) for hosting the one or more workloads, such as a mission-critical workload (or application), or the like to seamlessly provide services to the connected users.

A datacenter environment that lacks the required configurations may compel an administrator of the datacenter, to perform additional tasks during an actual deployment of the mission-critical system in the virtualized environment. Thus, delaying the deployment activity of the mission-critical system, and hosting the one or more workloads on such mission-critical system. In some examples, the additional tasks may include performing troubleshooting activities on the datacenter environment for identifying issues in the configurations of the datacenter environment and connectivity among the computing devices via the network switches, and fixing the identified configuration and connectivity issues.

A viable technical solution to the aforementioned problems may include determining readiness of a datacenter environment for deploying a production environment, such as a mission-critical system in a virtualized environment of the datacenter environment. In other words, the technical solution may include performing pre-deployment activities, such as validating the datacenter environment for required configurations to deploy the mission-critical system, even before attempting an actual deployment of the mission-critical system in the virtualized environment. Accordingly, performing the pre-deployment activities may result in identifying configuration issues in the datacenter environment upfront, and fixing the identified configuration issues in the datacenter environment before the actual deployment. Hence, the pre-deployment activities performed upfront may reduce the complexity during the actual deployment of the mission-critical system, and overall time spent on the actual deployment of the mission-critical system. In some non-limiting examples, fixing the identified configuration issues may include, for example, adding hardware, upgrading software or firmware versions, adding storage device, fixing network issues, correcting network interfaces for connectivity issues among the computing systems, or the like.

Accordingly, the present disclosure describes example implementations of a system and method for determining readiness of a datacenter for deploying a production system, such as a mission-critical system in a virtualized environment of a plurality of computing devices in the datacenter environment. The method includes receiving a parameter data of a device controller, and a first configuration data of the plurality of computing devices from the device controller that manages deployment and configuration of the virtual environment. The method further includes receiving a second configuration data of a plurality of networking switches connected to the plurality of computing devices. Further, the method includes validating the parameter data, the first and second configuration data by comparing against a predetermined data required for deploying the mission-critical system. The method further includes performing a connectivity test among the plurality of computing devices. Further, the method includes generating a report having the parameter data, the first and second configuration data, results of the connectivity test, and at least one of an error information or a warning information based on results of validation, for deploying the production system by the device controller. The method further includes assessing the report to determine readiness of the plurality of computing devices and the plurality of networking switches for deploying the production system in the virtualized environment.

FIG. 1 depicts a block diagram of a readiness analyzer engine 100 communicatively coupled to a datacenter environment 102 and a plurality of networking switches 108 in accordance to some examples of the present disclosure. The datacenter environment 102 includes a device controller 104 and a plurality of computing devices 106. In some examples, the datacenter environment 102 may additionally include an external storage device (not shown) connected to one or more device of the plurality of computing devices 106. In one or more examples, the plurality of computing devices 106 may be clustered together and integrated via high-speed fabrics 110 extending through the plurality of networking switches 108 in order to create a private network (production system) in the datacenter environment 102. In some examples, an administrator 114 of the datacenter environment 102 may select the plurality of computing devices 106 for deploying the production system. For example, the administrator 114 may select different types of hardware component manufactured from particular vendor and particular numbers of hardware components in each computing device 106 so as to enable the datacenter environment 102 to be compatible for deploying the production system. For example, the administrator 114 may select a network interface card (NIC) card manufactured by a particular vendor "AAA", and may choose to include at least two numbers of the NIC cards in each computing device 106.

The device controller 104 is a centralized management unit implemented using a hardware device (e.g., electronic circuitry, logic, or processors) or any combination of hardware and programming (e.g., instructions stored on the machine-readable medium). In some examples, the device controller 104 is connected to the plurality of computing devices 106 via the high-speed fabrics 110, and communicatively coupled to the readiness analyzer engine 100 via a network 112. In one or more examples, the network 112 may be a TCP/IP (Transmission Control Protocol/Internet Protocol) network, which is a suite of communication protocols used to interconnect network devices on internet.

The device controller 104 may manage i) deploying of a virtualization environment 150 on the datacenter environment 102, ii) configuration of the plurality of computing devices 106 in the virtualization environment 150, and iii) enable connectivity among the plurality of computing devices 106 for deployment of the production system in the virtualized environment 150. The steps involved in i) deployment of the virtualization environment 150, ii) configuring the plurality of computing devices 106, and iii) connecting the plurality of computing devices 106 to one another are discussed in greater details below. In one or more examples, the virtualized environment 150 may be a cloud infrastructure environment, a hypervisor infrastructure environment, or the like without deviating from the scope of the present disclosure. In some examples, the hypervisor infrastructure environment may be a VMware environment. In some other examples, the cloud infrastructure environment may be an Azure environment, an Amazon Web Service (AWS) environment, or the like without deviating from the scope of the present disclosure.

In some examples, the device controller 104 may include a management unit and a workflow automation unit for managing deployment and configuration of the i) virtualized environment 150, and ii) the production system in the virtualized environment 150. In some examples, the management unit may be a vCenter server, and the workflow automation unit may be a vRealize orchestrator. In one or more examples, the production system is a mission-critical system. For example, the mission-critical system may refer to a fault tolerant system (or an uninterrupted production platform) deployed in the virtualized environment 150 for hosting workload to seamlessly provide intended services to one or more users connected to the workload.

The device controller 104 may have a parameter data that are recorded in a management inventory list stored in a storage drive of the device controller 104. In some examples, the parameter data may include resource information, such as i) general attributes of the device controller 104, ii) types of deployment engine used for deploying the mission-critical system, and iii) user privileges in the device controller 104. The sample parameter data of the device controller 104 is represented below in Table-1 for reference purpose.

TABLE 1

| | Management unit current version - 111. |
|---|---|
| General attributes of the device controller | Workflow automation unit current version - ABC.<br>Management unit connectivity with the workflow automation unit. |
| User privileges in the device controller | Details of users and their roles defined in the device controller. |
| Types of deployment engine | Operating system of one or more virtual machines in each host device that is needed to deploy the mission-critical system configuration tool. |

Referring to Table-1, the user privileges may refer to details of users, and their roles defined in the device controller 104. For example, the roles includes an administrator role, a user role, or the like that is defined in the management unit of the device controller 104.

In some examples, the device controller 104 may deploy the virtualization software on each of the plurality of computing devices 106 in order to virtualize the datacenter environment 102 into the virtualization environment 150. This may allow each computing device 106 to function as a host device 152 in the virtualized environment 150. In some examples, the virtualization software is a hypervisor, such as EXSi, type-1 hypervisor. In one or more examples, each host device 152 may access a plurality of compute resources (or resource information) belonging to the corresponding computing device 106. In some non-limiting examples, the plurality of compute resources or resource information may include: i) general attributes of each host device 152, ii) network resources of each host device 152, iii) fabric pairs in each host device 152 for clustering with another host device 152, iv) protocol driver/software/firmware versions installed in each host device 152, v) storage drive mapped to each host device 152, vi) a storage adaptor of each host device 152, vii) a basic input output system (BIOS) of each host device 152, or the like.

Further, the device controller 104 may configure the plurality of compute resources of each host device 152 (or each computing device 106) to enable each host device 152 for the deployment of the mission-critical system in the virtualized environment 150. In particular, the administrator 114 may configure each host device 152 using the device controller 104. In some examples, the administrator 114 may configure a port group and switches details of each host device 152 based on the NIC card been plugged into a particular port in the corresponding host device 152. Similarly, the administrator 114 may install a firmware manufactured from a particular vendor and a specific version of the firmware based on the requirement (recommendation) for deploying the production system. Accordingly, the device controller 104 may store the configuration data of the resource information in each host device 152 in the management inventory list. It may be noted herein, that the configuration data of the resource information in each host device 152 (or each computing device 106) may also be referred to as "a first configuration data". In other words, the first configuration data, as discussed herein, may include the resource information, which may be grouped together as a hardware configuration data, a network configuration data, and a storage configuration data of each computing device 106. The sample first configuration data of each computing device 106 (or host device 152) is represented below in Tables-2-8 for reference purpose.

For example, the general attributes of each host device 152 that is configured by the device controller 104 are shown below in Table-2 for reference.

TABLE 2

| | |
|---|---|
| Server Model | ABC-GEN-1 |
| Datacenter | Mission-Critical System-VMware2 |
| Cluster | VMWARE9 |
| Hardware vendor | ABC |
| ESXi version | 6.7.0 |
| ESXi build number | 15160138 |
| CPU model | Intel(R) Xeon(R) Gold 6140 CPU @ 2.30 GHz |
| Processor speed | 2.29 GHz |
| Physical memory | 511.66 Gb |
| Sockets | 2 |
| Number of cores | 36 |
| Number of threads | 72 |
| Host power state | Powered On |
| Host connection | Connected |
| Host Sync status | TRUE |
| Total PNICs | 18 {SRIOV NICs 7, VMXNET NICs 8, Passthrough NICs 3} |

The network resources of each host device 152 that is configured by the device controller 104 is shown below in Table-3 for reference.

TABLE 3

| | |
|---|---|
| Port Group | VM Network |
| vSwitches | vSwitch0 |
| MTU | 1500 |
| PNIC count | 1 |
| Physical NIC | vmnic0 |
| Numbers of NIC cards | 1 |
| NIC attributes | {Description: ABC company's Ethernet, Link status: Up, Link speed: 1000, PCI Device: 0000:02:00.0, Firmware version: BC 1.46 NCSI 1.5.1.0, Configuration: VMXNET model, Max. VFs: N/A, Active VFs: N/A} |

The fabric pairs configured in each host device 152 for clustering with other host device 152 in the datacenter environment 102 is shown below in Table-4 for reference.

TABLE 4

| PCIDevice; PortGroup |
|---|
| 0000:37:00.0; RocEX 0000:37:00.1; RocEY |
| 0000:86:00.0; RocEX 0000:86:00.1; RocEY |

The protocol driver/software/firmware versions installed in each host device 152 that is needed to communicate with other host device 152 is shown below in Table-5 for reference.

TABLE 5

| |
|---|
| Manufacturer "BBB"'s OFED version: 4.17.70.1-1OEM.670.0.0.8169922 |
| Manufacturer "BBB"'s MST version: 4.14.2.17-1OEM.650.0.0.4598673 |
| Manufacturer "BBB"'s MFT version: 4.14.2.17-0 |

The storage drive mapped to each host device 152 by the device controller 104 is shown below in Table-6 for reference.

TABLE 6

| Storage drive | Capacity (GB) | Free (GB) | Status | Model | Type | Adapter |
|---|---|---|---|---|---|---|
| datastore1 (10) | 551 | 543 | on | LOGICAL VOLUME | HDD | vmhba0 |
| IMGSHARE | 232 | 124 | Degrade | MSA 2050 SAN | HDD | Vmhba72 |
| MSA1CLUN5 | 302 | 300 | Degrade | MSA 2050 SAN | HDD | Vmhba72 |

The storage adaptor of the host device 152 that is configured in the datacenter environment 102 by the device controller 104 is shown below in Table-7 for reference.

TABLE 7

| | |
|---|---|
| Adapter Name | vmhba70 |
| Model | iSCSI Software Adapter |
| Link state | Online |
| Driver | iscsi_vmk |
| Adapter settings | { iscsivmk-LunQDepth: Not set iscsivmk HostQDepth: Not set } |

The BIOS of the host device 152 that is configured by the device controller 104 is shown below in Table-8 for reference.

TABLE 8

| | |
|---|---|
| Logical drives in the host | No |
| Raid value | 0 |
| Virtualization | Enabled |
| Intel VT-D | Enabled |
| SR-IOV | Enabled |
| Intel HyperThreading | Disabled |
| Processor core disable | 0 |
| Processor x2APIC Support | Enabled |
| Turbo Boost | Enabled |
| Power profile | MaxPerf |
| Intel QPI Link Enablement | Auto |
| Dynamic Power Savings mode Response | Fast |
| Collaborative Power control | Enabled |
| Redundant power supply mode | BalancedMode |

The first configuration data corresponding to each computing device 106 stored in the device controller 104 may be accessible by a valid/authenticated user(s) of the device controller 104, post completion of tasks related to deployment of the virtualized environment 150 on each computing device 106, and configuration of the host device 152 in the virtualized environment 150.

The readiness analyzer engine 100 may be a utility engine implemented on a computing system 116 located outside the datacenter environment 102. By way of example, the readiness analyzer engine 100 may be implemented using hardware devices (e.g., electronic circuitry, logic, or processors) or any combination of hardware and programming (e.g., instructions stored on the machine-readable medium) to implement various functionalities described herein.

The readiness analyzer engine 100 may be configured for determining readiness of the plurality of computing devices 106 of the datacenter environment 102, and the plurality of networking switches 108 for deploying the mission-critical system in the virtualized environment 150. For example, the readiness analyzer engine 100 may retrieve configuration data of the computing devices 106 and networking switches 108, validate the retrieved configuration data, and generate a report with inventory along with gaps (or mismatch) it identifies in the retrieved configuration data against a pre-determined configuration data. The steps involved in retrieving the configuration data of the computing devices 106, and the networking switches 108, validating the retrieved configuration data, performing the connectivity test, and generating the reports are discussed in greater details below.

Further, the readiness analyzer engine 100 may perform a connectivity test among the plurality of computing devices 106 and generate the report with connectivity test results. The retrieved configuration data analysis and connectivity test results in the form of reports may help the administrator 114 to take corrective actions upfront, thereby reducing the deployment complexity and overall time. This may also enhance the overall customer experience in deploying the mission-critical system in the virtualized environment 150 and use it for their business needs.

The readiness analyzer engine 100 may have a command line interface 118 or a graphical user interface (GUI) 120. Thus, the administrator 114 may run a specific command through the command line interface 118 or select an option from the GUI 120, to retrieve and validate the parameter and/or configuration data from the datacenter environment 102.

In some examples, the administrator 124 may enter user credentials via the command line interface 118 or the GUI 120, to allow the readiness analyzer engine 100 to establish connection with the device controller 104. For example, the readiness analyzer engine 100 may establish connection with the management unit (for example, vCenter server) of the device controller 104. In such examples, the device controller 104 may first validate the user credentials and later allow the readiness analyzer engine 100 to establish the connection with the device controller 104 based on the verification of the user credentials.

Further, the readiness analyzer engine 100 may query the management unit of the device controller 104, to obtain the parameter data of the device controller 104, and the first configuration data of the plurality of computing devices 106 (or plurality of host devices 152) from the device controller 104. It may be noted herein that the readiness analyzer engine 100 may receive the parameter data as shown in Table-1 and the first configuration data as shown in Tables-2-8 from the device controller 104. The readiness analyzer engine 100 may later create a utility inventory list having i) parameter data and ii) the first configuration data of each of the plurality of computing devices 106. The utility inventory list may be stored in a memory of the readiness analyzer engine 100.

The readiness analyzer engine 100 may simultaneously establish connection with the plurality of networking switches 108. In some examples, readiness analyzer engine 100 may use secure shell to establish connection with the plurality of networking switches 108. Subsequently, the readiness analyzer engine 100 may run specific commands based on the operating system (OS), such as Onyx or Comware running on each of the plurality of networking switches 108 to obtain a second configuration data from each of the plurality of networking switches 108. In some examples, the second configuration data may include resource information of the plurality of networking switches, such as configuration status of network interfaces for one or more networking protocols in each of the plurality of networking switches 108. The sample second configuration data is shown in Table-9 for reference.

TABLE 9

| Spanning tree protocol settings | |
|---|---|
| Screen-length | Disable |
| Protocol status | Enabled |
| Protocol Std. | IEEE 802.1s |
| Version | 3 |
| Bridge-Prio. | 32768 |
| MAC address | e8f7-24bb-8293 |
| Max age(s) | 20 |
| Forward delay(s) | 15 |
| Hello time(s) | 2 |
| Max hops | 20 |
| TC Snooping 300 | Disabled |

| Priority Flow Control status of interfaces | | |
|---|---|---|
| Interface | Admin Mode | Oper Mode |
| FGE1/0/1 | Disabled | Disabled |
| FGE1/0/2 | Disabled | Disabled |
| FGE1/0/3 | Disabled | Disabled |
| FGE1/0/4 | Disabled | Disabled |
| FGE1/0/5 | Disabled | Disabled |
| FGE1/0/6 | Disabled | Disabled |
| FGE1/0/7 | Disabled | Disabled |
| FGE1/0/8 | Disabled | Disabled |
| FGE1/0/9 | Disabled | Disabled |
| FGE1/0/10 | Disabled | Disabled |
| FGE1/0/11 | Disabled | Disabled |

| Global pause settings of interfaces | |
|---|---|
| Interface | Status |
| FortyGigE1/0/1 | Enabled |
| FortyGigE1/0/2 | Enabled |
| FortyGigE1/0/3 | Enabled |
| FortyGigE1/0/4 | Enabled |
| FortyGigE1/0/5 | Enabled |
| FortyGigE1/0/6 | Enabled |
| FortyGigE1/0/7 | Enabled |
| FortyGigE1/0/8 | Enabled |
| FortyGigE1/0/9 | Enabled |
| FortyGigE1/0/10 | Enabled |

In some examples, the second configuration data as shown in Table-9, of each of the plurality of networking switches 108 may be updated in the utility inventory list stored in the memory of the readiness analyzer engine 100.

The readiness analyzer engine 100 may further obtain a pre-determined data that is required (or recommended) for deploying the mission-critical system in the virtualized environment 150 from a manufacturer of a mission-critical system software. In such examples, the pre-determined data obtained from the manufacturer may be stored in a storage drive of the readiness analyzer engine 100. In some examples, the pre-determined data is a pre-determined inventory list. In some examples, the pre-determined data includes pre-determined resource information criteria for deploying the mission-critical system. In some examples, the pre-determined resource information criteria may include i) recommended parameter data and ii) recommended configuration data, such as a recommended first configuration data and a recommended second configuration data, that are suitable for deploying the mission-critical system in the virtualized environment 150.

In some examples, the recommended parameter data may include pre-determined resource information corresponding to a recommended device controller and its configurations that are suitable for deploying the mission-critical system. Similarly, the recommended first configuration data may include pre-determined resource information corresponding to a plurality of recommended computing devices and its configuration details that are suitable for deploying the mission-critical system. Further, the recommended second configuration data may include pre-determined resource information corresponding to a plurality of recommended networking switches and its configuration details that are suitable for deploying the mission-critical system.

Even though the recommended parameter data and the recommended first and second configuration data as discussed hereinabove are not shown, it may be noted that such data may be provided by the manufacturer of the mission-critical system software in a data format/framework that is substantially similar to a data format/framework that is used to represent the parameter data (refer to Table-1), the first configuration data (refer to Tables-2-8), and the second configuration data (refer to Table-9).

The readiness analyzer engine 100 may then validate the parameter data (as shown in Table-1), the first configuration data (as shown in Tables-2-8), and the second configuration data (as shown in Table-9) by comparing against the pre-determined data (as discussed hereinabove) required (or recommended) for deploying the mission-critical system in the virtualized environment 150. For example, the readiness analyzer engine 100 may retrieve the pre-determined inventory list from the storage drive and compare with the utility inventory list stored in the memory for determining an error information or a warning information based on the comparison of both inventory lists.

In one or more examples, validating may include processing the resource information in the parameter data, and the first and second configuration data to determine whether the resource information meets the pre-determined resource information criteria to generate the error information and/or the warning information. In such examples, the error information may include an indicator that the resource information does not meet the pre-determined resource information criteria.

In some examples, referring to the resource information in the parameter data (as shown in Table-1), the management unit has current version as "111" and the workflow automation unit has current version as "ABC". However, the pre-determined resource information criteria in the recommended parameter data may have a recommended management unit version as "111" and a recommended workflow automation unit version as "XYZ". Further, the pre-determined resource information criteria in the recommended parameter data may recommend that the workflow automation unit versions "XYZ" or "AAA" are compatible with the management unit version "111" to ensure the workflows for system deployment to run. In such examples, the readiness analyzer engine 100 may compare the parameter data and the recommended parameter data, and determine the error information in the work automation unit current version and the compatibility mismatch/discrepancy between the work automation unit current version and the management unit current version. For example, the error information may include the indicator that the work automation unit current version does not meet the pre-determined work automation unit version criteria. Further, the error information may include the indicator that the compatibility between the work automation unit current version and the management unit current version does not meet the pre-determined compatibility criteria between the work automation unit and management unit.

In some other examples, referring to the first configuration data as shown in Table-3, the network resource (or the resource information) in one of the computing device 106 may have "1" number of NIC card. However, the recommended first configuration data may have a recommendation to have "2" numbers of NIC cards in each computing device. In such examples, the readiness analyzer engine 100 may compare the first configuration data and the recommended first configuration data and determine the error information in one of the computing device 106 do not have the required number of NIC cards. For example, the error information may include the indicator that the network resource does not meet the pre-determined network resource criteria.

In some other examples, referring to the first configuration data as shown in Table-8, the BIOS in one of the computing device 106 may not have a logical drive. However, the recommended first configuration data may have a recommendation that BIOS of each computing device should have a logical drive. In such examples, the readiness analyzer engine 100 may compare the first configuration data and the recommended first configuration data and determine the error information in one of the computing device 106 do not have the logical drive in the BIOS. For example, the error information may include the indicator that the BIOS resource does not meet the pre-determined BIOS resource criteria.

In some examples, referring to the second configuration data as shown in Table-9, the spanning tree protocol settings status is enabled. However, the recommended second configuration data may have a recommendation that spanning tree protocol settings status to be disabled. In such examples, the readiness analyzer engine 100 may compare the second configuration data and the recommended second configuration data, and determine the error information in one of the networking switches 108 to have the spanning tree protocol settings status as enabled, which may need to be disabled. For example, the error information may include the indicator that the network switches protocol setting does not meet the pre-determined protocol setting criteria.

In one or more examples, the warning information may represent the resource information of the plurality of computing devices 106 that is unessential for deploying the production system in the virtualized environment 150. In other words, the warning information may include another indicator that the resource information is unessential for deploying the production system in the virtualized environment.

In some examples, referring to the first configuration data as shown in Table-8, the BIOS in one of the computing device 106 may not have a raid value as "0". However, the recommended first configuration data may have a recommendation that the BIOS of each computing device should have a raid value set as "1". In such examples, the readiness analyzer engine 100 may compare the first configuration data and the recommended first configuration data, and determine the warning information in one of the computing device 106 based on the current raid value that is set as "0", as against the value "1" per the recommendation. For example, the warning information may include the indicator that the BIOS raid value set as "O" is unessential for deploying the production system in the virtualized environment.

In some other examples, the network resource in one of the computing device 106 may have "3" numbers of NIC cards. However, the recommended first configuration data may have a recommendation to have "2" numbers of NIC cards in each computing device. In such examples, the readiness analyzer engine 100 may compare the first configuration data and the recommended first configuration data, and determine the warning information in one of the computing device 106 to have the more than required number of NIC cards. For example, the warning information may include the indicator that the three numbers of the network cards are unessential for deploying the production system in the virtualized environment. In such examples, the administrator 114 may remove or de-configure such resource information based on the warning information from the readiness analyzer engine 100.

The readiness analyzer engine 100 may generate a sub-report including the parameter data, the first configuration data, and the second configuration data, and at least one of an error information, a warning information based on results of validation for deploying the production system by the device controller.

Further, the readiness analyzer engine 100 may initiate connectivity test among the plurality of computing devices 106. For example, the readiness analyzer engine 100 may perform interconnect validation among the plurality of computing devices 106 that is configured in the datacenter environment 102. In one or more examples, deploying the mission-critical system in the virtualized environment 140 may need the plurality of computing devices 106 to be clustered together using redundant high-speed fabrics 110 and integrated with storage device and networking switches 108. To ensure the plurality of computing devices 106 are clustered together, the readiness analyzer engine 100 may request the device controller 104 to deploy at least one virtual test-computing machine 154 in the virtualized environment 150 on each computing device 106. For example, the device controller 104 may deploy at least one virtual test-computing machine 154 for each fabric pair configured in the corresponding host device 152. Later, the device controller 104 may power-on each virtual test-computing machine 154.

Further, the readiness analyzer engine 100 may request the device controller 104 to configure network interfaces on each virtual test-computing machine 154 among a plurality of virtual test-computing machines. For example, the device controller 104 may configure network interfaces such as "eth0", "ibx", and "iby" on each virtual test-computing machine 154. In some examples, the network interfaces "eth0" is configured to validate connectivity among host devices 152 through maintenance network. Similarly, the network interfaces "ibx" and "iby" are configured to validate connectivity among the host devices 152 through switch network. Since, deploying the mission-critical system may require the host devices 152 to be interconnected via redundant networking switches 108 to achieve fault tolerance, one of the networking switch 108 is configured for the networking interface "ibx", while the other networking switch 108 is configured for the networking interface "iby".

Further, the readiness analyzer engine 100 may perform the connectivity test among the plurality of virtual test-computing machines 154 through the plurality of networking switches 108. In some examples, the connectivity test is performed using a ping test. For example, performing the ping tests include pinging from each network interface ("eth0", "ibx", and "iby") of one virtual test-computing machine 154A belonging to a host device 152A to each network interfaces of other virtual test-computing machine 154B belonging to another host device 152B in the datacenter environment 102. The goal of the ping tests are to validate connectivity among the virtual test-computing machines 154, and detect any inadvertent cross-connections there between. For example, the "ibx" network interface of one virtual test-computing machine 154A should not be able to ping the "iby" interface of other virtual test-computing machine 154B, whereas, the "ibx" network interface of one virtual test-computing machine 154A should be able to ping the "ibx" interface of other virtual test-computing machine 154B. The readiness analyzer engine 100 may identify one or more failed or passed results based on the ping tests. Accordingly, the readiness analyzer engine 100 may generate another sub-report including connectivity test results based on the ping tests, for examples.

The sample connectivity test results is shown in Table-10 for reference.

TABLE 10

Ping test- 15.213.80.150 => 15.213.80.148
eth0 192.168.37.0 => eth0 192.168.37.1 Ping passed; Test passed.
IB_x 10.1.1.0 => IB_x 10.1.1.1 Ping passed; Test passed.
IB_x 10.1.1.0 => IB_y 10.129.1.1 Ping passed; TEST FAILED.
IB_y 10.129.1.0 => IB_x 10.1.1.1 Ping passed; TEST FAILED.
IB_y 10.129.1.0 => IB_y 10.129.1.1 Ping passed; Test passed.
Ping test- 15.213.80.148 => 15.213.80.150
eth0 192.168.37.1 => eth0 192.168.37.0 Ping passed; Test passed.
IB_x 10.1.1.1 => IB_x 10.1.1.0 Ping failed; TEST FAILED.
IB_x 10.1.1.1 => IB_y 10.129.1.0 Ping failed; Test Passed.
IB_y 10.129.1.1 => IB_x 10.1.1.0 Ping failed; Test Passed.
IB_y 10.129.1.1 => IB_y 10.129.1.0 Ping failed; TEST FAILED.

In one or more examples, the readiness analyzer engine 100 may consolidate the results obtained by the validation of the parameter data, the first configuration data, the second configuration data, and the connectivity test results, as discussed herein above, and generate a consolidated report (or report). In some examples, the consolidated report may include the parameter data, the first configuration data, the second configuration data, results of the connectivity test, and at least one of the error information or the warning information based on results of validation. It may be noted herein that a sample consolidated report is not shown for ease of illustration purpose, which should not be construed as a limitation of the present disclosure.

The readiness analyzer engine 100 may further determine readiness of the plurality of computing devices 106 and the plurality of networking switches 108 for deploying the production system in the virtualized environment, based on the consolidated report. For example, the readiness analyzer engine 100 may execute a data analysis algorithm on the consolidated report and communicate the error and warning information, and the connectivity test failed information to the administrator 114. In some other examples, the readiness analyzer engine 100 may make the consolidated report available for the administrator 114 for review and analysis. In all such examples, the administrator 114 may refer to the error information and/or the connectivity test failed information and easily fix the errors in the plurality of computing devices 106, the plurality of networking switches 108, or connectivity issues among the plurality of computing devices 106. After the errors and/or the connectivity issues are fixed (or addressed) by the administrator 114, the readiness analyzer engine 100 may re-validate at least one of the parameter data, the first configuration data, the second configuration data, and the connectivity test results in order to determine the readiness of the datacenter environment 102 for deploying the mission-critical system in the virtualized environment 150.

After determining that the datacenter environment 102 is ready for deploying the mission-critical system, the device controller 104 may use the virtualization software to deploy one or more virtual machines (not shown) on each host device 152 in order to deploy the mission-critical system in the virtualized environment 150. In such examples, the device controller 104 may further configure each virtual machine to deploy the mission-critical system in the virtualized environment 150. In some examples, the mission-critical system is formed by clustering the plurality of computing devices 106 (or virtual machines) together using high-speed fabrics 110 and integrated with the storage device (not shown—connected to the one or more computing device 106) and the plurality of networking switches 108. The mission-critical system in the virtualized environment 150, may then facilitate to host (execute or run) one or more workloads (i.e., application software), such as a mission-critical workload of a customer for delivering intended services to the connected users. In some non-limiting examples, the mission-critical workload may include a stock market application, a navigational support application for a spacecraft, or the like.

Figure 2:
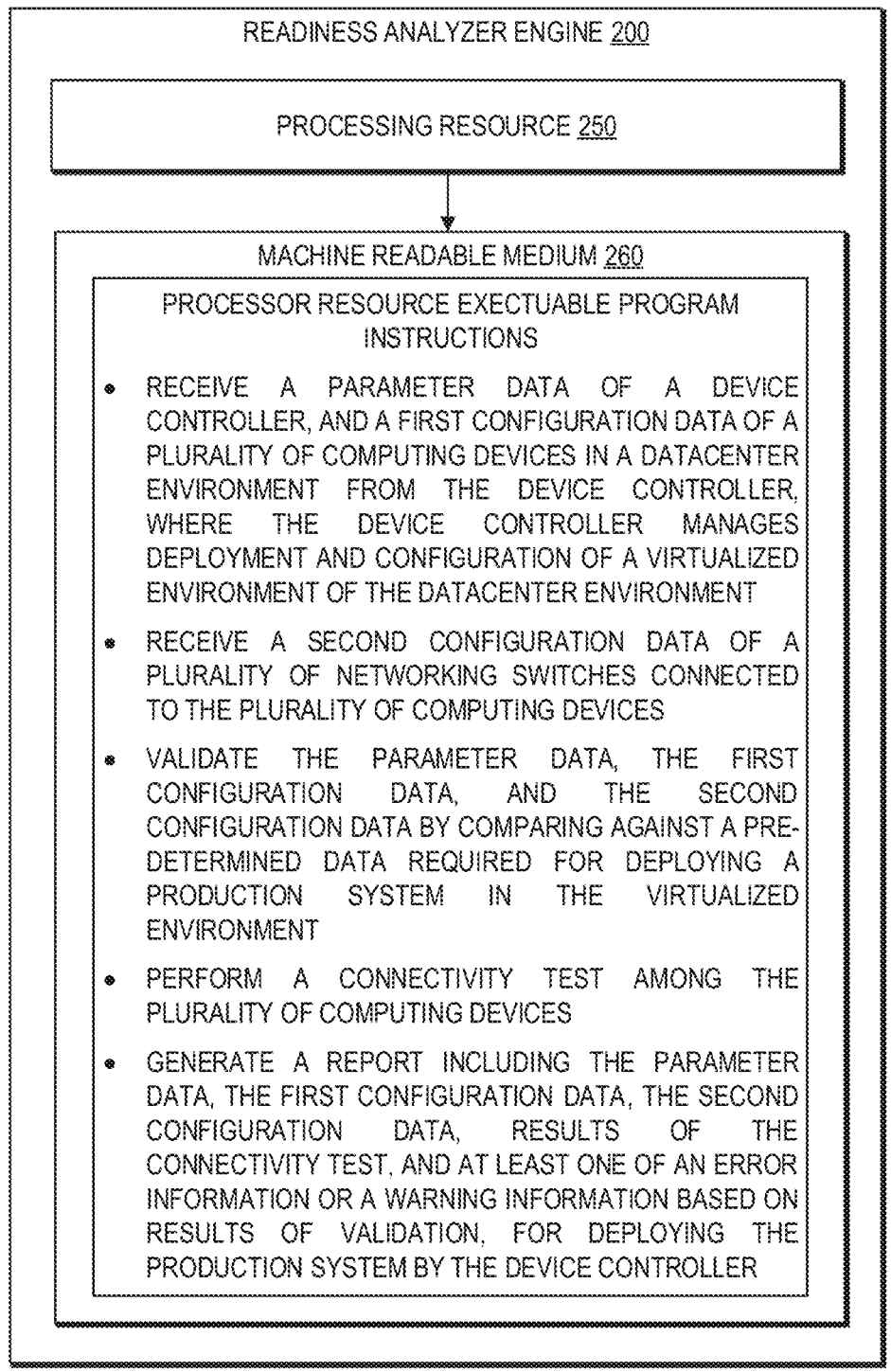
FIG. 2 is a block diagram depicting a readiness analyzer engine having a processing resource operably coupled to a machine readable medium storing executable program instructions, in accordance with some examples of the present disclosure.

FIG. 2 depicts a block diagram of a readiness analyzer engine 200 including a processing resource 250 and a machine readable medium 260 storing executable program instructions. It should be noted herein that the readiness analyzer engine 200 referred to in FIG. 2 may be same or similar to a readiness analyzer engine 100 described in FIG. 1. In some examples, the processing resource 250 is operably coupled to the machine readable medium 260. The processing resource 250 may be a physical processor. In some examples, the physical processor may be a microprocessor suitable for performing the functionality described in relation to FIG. 1. In some examples, the machine readable medium 260 is non-transitory and is alternatively referred to as a non-transitory machine readable medium. The processing resource 250 executes one or more program instructions (e.g., processing resource executable program instructions) to perform one or more functions described in FIG. 1.

The processing resource 250 may execute program instructions for receiving a parameter data of a device controller, and a first configuration data of a plurality of computing devices from the device controller. In one or more examples, the readiness analyzer engine is communicatively coupled to the device controller. Further, the device controller is connected to the plurality of computing devices of a datacenter environment. The device controller manages deployment and configuration of a virtualized environment on the datacenter environment. In some examples, the parameter data includes at least one of general attributes of the device controller, types of deployment engine, or user privileges in the device controller. The first configuration data includes at least one of a hardware configuration data, a network configuration data, or a storage configuration data of each of the plurality of computing devices.

Further, the processing resource 250 may later execute the one or more program instructions for receiving a second configuration data of a plurality of networking switches connected to the plurality of computing devices. In one or more examples, the readiness analyzer engine is further communicatively coupled to the plurality of networking switches. The second configuration data includes configuration status of network interfaces for one or more networking protocols in each of the plurality of networking switches.

The processing resource 250 may further execute the one or more program instructions for validating the parameter data, the first configuration data, and the second configuration data by comparing against a pre-determined data required for deploying a production system in the virtualized environment. In some examples, the pre-determined data may be provided by a manufacturer of a mission-critical system software. The pre-determined data may include a recommended parameter data, a recommended first configuration data, and a recommended second configuration data for deploying the mission-critical system in the virtualized system.

The processing resource 250 may further execute the one or more program instructions for generating a sub-report including the parameter data, the first configuration data, and the second configuration data, and at least one of an error information, a warning information based on results of validation for deploying the production system by the device controller. In such examples, the readiness analyzer engine may then determine if the sub-report includes any error information, based on the analysis of the sub-report. If it is determined that the sub-report does not include error information or in other words, if it is determined that the parameter data, the first configuration data, and the second configuration data are configured as per the requirement configuration (or recommendation configuration) based on analysis of the sub-report. Then, the readiness analyzer engine may proceed with executing the one or more program instructions for performing a connectivity test among the plurality of computing devices. In some examples, performing the connectivity test includes executing program instructions to instruct the device controller to deploy a virtual test-computing machine in the virtualized environment on each of the plurality of computing devices, and configure network interfaces on each virtual test-computing machine among a plurality of virtual test-computing machines. Further, performing the connectivity test includes executing program instructions to check connectivity between the plurality of virtual test-computing machines through the plurality of networking switches, and generating another sub-report including the results of the connectivity test.

The processing resource 250 may further execute the one or more program instructions for generating a report (combination of the sub-report and other sub-report) including the parameter data, the first configuration data, the second configuration data, results of the connectivity test, and at least one of an error information or a warning information based on results of validation, for deploying the production system by the device controller. In such examples, administrator of the datacenter environment may review the report and fix the errors in the datacenter environment to make it ready for deploying the mission-critical system in the virtualized environment.

Figure 3:
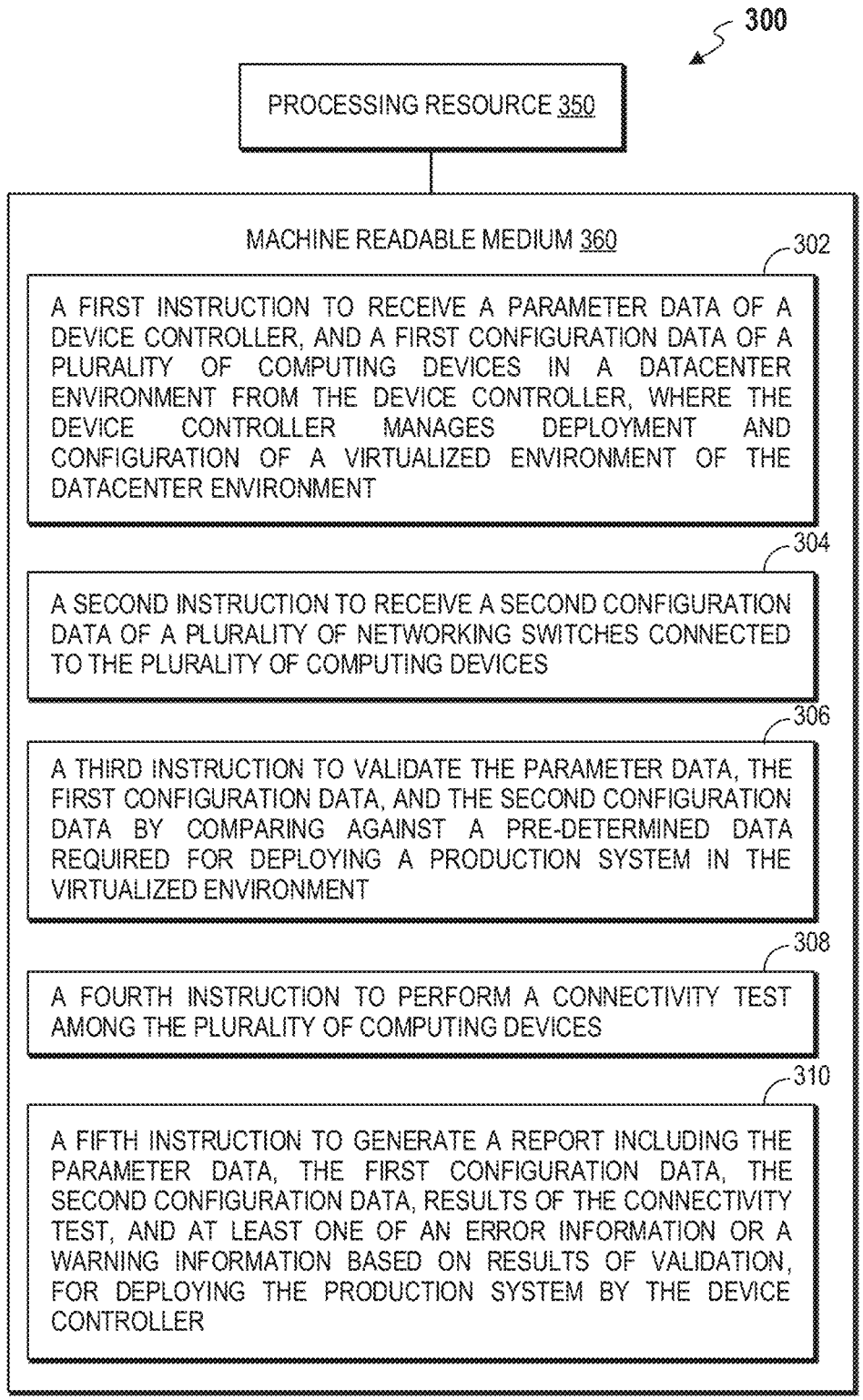
FIG. 3 is a block diagram depicting a processing resource and a machine readable medium encoded with example instructions executable by a readiness analyzer engine for validating readiness of computing devices of a datacenter environment and networking switches for deploying a production system in a virtualized environment of the datacenter environment, in accordance with some examples of the present disclosure.

FIG. 3 depicts a block diagram 300 of a processing resource 350 and a machine readable medium 360 encoded with example instructions executable by a readiness analyzer engine for validating readiness of computing devices of a datacenter environment and networking switches for deploying a production system in a virtualized environment of the datacenter environment. It should be noted herein that the readiness analyzer engine referred to in FIG. 3 may be same or similar to readiness analyzer engine 100, 200 described in FIGS. 1-2 respectively. The machine readable medium 360 is non-transitory and is alternatively referred to as a non-transitory machine readable medium. In some examples, the machine readable medium 360 may be accessed by the processing resource 350. In some examples, the machine readable medium 360 stores the program instructions corresponding to functionality of the readiness analyzer engine, as discussed in FIGS. 1-2. The machine readable medium 360 may be encoded with example first, second, third, fourth, and fifth instructions 302, 304, 306, 308, and 310 respectively.

The first instruction 302, when executed by the processing resource 350 may implement aspects of receiving a parameter data of a device controller, and a first configuration data of a plurality of computing devices from the device controller. In one or more examples, the readiness analyzer engine is communicatively coupled to the device controller. Further, the device controller is connected to the plurality of computing devices of a datacenter environment, where the device controller manages deployment and configuration of a virtualized environment on the datacenter environment. The step of receiving the parameter data, the first configuration data are described in details in FIG. 1.

The second instruction 304 when executed by the processing resource 350 may implement aspects of receiving a second configuration data of a plurality of networking switches connected to the plurality of computing devices. In one or more examples, the readiness analyzer engine is communicatively coupled to the plurality of networking switches. The step of receiving the second configuration data is described in details in FIG. 1.

The third instruction 306, when executed by the processing resource 350 may implement aspects of validating the parameter data, the first configuration data, and the second configuration data by comparing against a pre-determined data required for deploying a production system in the virtualized environment. In some examples, the pre-determined data may be provided by a manufacturer of a mission-critical system software. The pre-determined data may include a recommended parameter data, a recommended first configuration data, and a recommended second configuration data for deploying the mission-critical system in the virtualized system. The step of validating the parameter data, the first and second configuration data is described in details in FIG. 1. In some examples, the third instruction, may also result in generating a sub-report including a sub-report including the parameter data, the first configuration data, and the second configuration data, and at least one of an error information, a warning information based on results of validation for deploying the production system by the device controller.

The fourth instruction 308, when executed by the processing resource 350 may implement aspects of performing a connectivity test among the plurality of computing devices. In some examples, performing the connectivity test includes executing program instructions to instruct the device controller to deploy a virtual test-computing machine in the virtualized environment on each of the plurality of computing devices, and configure network interfaces on each virtual test-computing machine among a plurality of virtual test-computing machines. Further, performing the connectivity test includes executing program instructions to check connectivity between the plurality of virtual test-computing machines through the plurality of networking switches, and generating another report including the results of the connectivity test. The step of performing the connectivity test among the plurality of computing devices is described in details in FIG. 1.

The fifth instruction 310, when executed by the processing resource 350 may implement aspects of generating a consolidated report (or report) including the parameter data, the first configuration data, the second configuration data, results of the connectivity test, and at least one of the error information or the warning information based on results of validation, for deploying the production system by the device controller. In such examples, administrator of the datacenter environment may review the consolidated report and fix the errors in the datacenter environment to make it ready for deploying the mission-critical system in the virtualized environment. The step of generating the report (or consolidated report) is described in details in FIG. 1.

FIG. 4 is a flow diagram depicting a method 400 for validating readiness of computing devices and networking switches for deploying a production system in a virtualized environment of a datacenter environment. It should be noted herein that the method 400 is described in conjunction with FIG. 1. In one or more examples, a plurality of steps discussed herein in the method 400 is performed by a readiness analyzer engine.

The method 400 starts at block 402 and continues to block 404. At block 404, the method 400 includes receiving a parameter data of a device controller and a first configuration data of a plurality of computing devices in a datacenter environment from the device controller, as described in FIG. 1. In one or more examples, the device controller manages deployment and configuration of a virtualized environment on the datacenter environment. In such examples, the device controller may store a management utility list of the parameter data and the first configuration data in a storage drive of the device controller after the deployment and configuration of the virtualized environment on the datacenter environment. In such examples, the device controller may access the parameter data and the first configuration data stored in the storage drive of the device controller on receipt of request from the readiness analyzer engine, and transfer a copy of the parameter data and the first parameter data to the readiness analyzer engine. The method 400 continues to block 406.

At block 406, the method 400 includes receiving a second configuration data from a plurality of networking switches, as described in FIG. 1. In one or more examples, network interfaces for one or more networking protocols in each of the plurality of networking switches may have been configured by the administrator. In such examples, the second configuration file having such configuration details may be stored in a storage drive of corresponding network switch. Hence, when the plurality of networking switches receives the request from the readiness analyzer engine for the second configuration data, each networking switch may transfer a copy of the second configuration file to the readiness analyzer engine. The method 400 continues to block 408.

At block 408, the method 400 includes validating the parameter data, and the first configuration data received from the device controller, and the second configuration data received from the plurality of networking switches by comparing against a pre-determined data required for deploying a production system in the virtualized environment, as described in FIG. 1. For example, validating may include processing the resource information in the parameter data, and the first and second configuration data to determine whether the resource information meets the pre-determined resource information criteria to generate an error information and/or a warning information. In some examples, the pre-determined data may be provided by a manufacturer of a mission-critical system software. The pre-determined data may include a recommended parameter data, a recommended first configuration data, and a recommended second configuration data, which are suitable (or recommended) for deploying the mission-critical system in the virtualized system. The method 400, continues to block 410.

At block 410, the method 400 includes generating a report (a sub-report) including the parameter data, the first and second configuration data, at least one of the error information or the warning information based on the validation of the parameter data, the first configuration data, and the second configuration data, as described in FIG. 1. In some examples, the error information may include an indicator that the resource information does not meet the pre-determined resource information criteria. Similarly, the warning information may include another indicator that the resource information is unessential for deploying the production system in the virtualized environment.

At block 412, the method 400 includes determining readiness of the datacenter environment based on the sub-report, as described in FIG. 1. In some examples, the readiness analyzer engine may run a data analytics algorithm to determine if the sub-report includes the error information. If the sub-report includes the error information, the readiness analyzer engine may provide the error information details to the administrator of the datacenter environment to fix the errors in the corresponding computing device and/or the networking switch. In some other examples, the readiness analyzer engine may provide the sub-report to the administrator for analysis. After, the administrator fixes the errors in the corresponding computing device and/or the networking switch, the administrator may instruct the readiness analyzer engine to re-validate the readiness of the plurality of computing devices and the networking switches for deploying the mission-critical system. Accordingly, the readiness analyzer engine may reinitiate the validation process i.e., "no" at block 412, of determining readiness of the computing systems and networking switches. In particular, the readiness analyzer engine may repeat the steps recited in blocks 404 to 410 to re-determine the readiness of the computing devices and the networking switches.

At block 412, if the readiness analyzer engine determines that the sub-report do not include error information, i.e., "yes" at block 412, the method 400 continues to block 414, where the readiness analyzer engine may proceed with the step of performing connectivity test among the plurality of computing devices to further determine the readiness of the datacenter environment for deploying the mission-critical system in the virtualized environment. The method 400 ends at block 416.

FIG. 5 is a flow diagram depicting a method 500 of performing connectivity test among computing devices through networking switches for deploying a production system in a virtualized environment of a datacenter environment, in accordance with embodiments of the present disclosure. It should be noted herein that the method 500 is described in conjunction with FIGS. 1 and 4. In one or more examples, a plurality of steps discussed herein in the method 500 is performed by a combination of a device controller and the readiness analyzer engine.

The method 500 starts at block 502 and continues to block 504. At block 504, the method 500 includes the readiness analyzer engine to instruct the device controller to deploy a virtual test-computing machine in the virtualized environment on each of the plurality of computing devices, as discussed in FIG. 1. In some examples, the device controller may create the virtual test-computing machine on each host device deployed on a corresponding computing device in the virtualized environment. The method of deploying and configuring the virtualization environment on each computing device to form the host device is discussed in greater details in FIG. 1. The method 500 continues to block 506.

At block 506, the method 500 includes the readiness analyzer engine instructing the device control to further configure network interfaces on each virtual test-computing machine among a plurality of virtual test-computing machines, as discussed in FIG. 1. For example, the device controller may configure network interfaces such as "eth0", "ibx", and "iby" on each virtual test-computing machine. In some examples, the network interfaces "eth0" is configured to validate connectivity among host device through maintenance network. Similarly, the network interfaces "ibx" and "iby" are configured to validate connectivity among the host device through the switch network. The method 500 continues to block 508.

At block 508, the method 500 includes the readiness analyzer engine checking the connectivity among the plurality of computing devices through the plurality of networking switches, as discussed in FIG. 1. For example, the readiness analyzer engine may perform the ping test to validate connectivity and detect any inadvertent cross-connections there between. The method 500 continues to block 510.

At block 510, the method 500 includes the readiness analyzer engine to generate another report (another sub-report) including results of the connectivity test, as discussed in FIG. 1. The method continues to block 512.

Further, at block 512, the method 500 includes determining readiness of the datacenter environment based on the other sub-report, as described in FIG. 1. In some examples, the readiness analyzer engine may run a data analytics algorithm to determine if the other sub-report includes at least one test failed (as shown in Table-10). If the report includes the test failed details, the readiness analyzer engine may provide the test failed details to the administrator of the datacenter environment to fix the network interfaces, which caused the test to fail in the corresponding networking switch. In some other examples, the readiness analyzer engine may provide the other sub-report including the connectivity test results to the administrator for analysis. After, the administrator fixes the network interfaces based on the failed test results in the corresponding networking switch, the administrator may instruct the readiness analyzer engine to re-validate the connectivity among the plurality of computing devices for deploying the mission-critical system. Accordingly, the readiness analyzer engine may reinitiate the connectivity test process i.e., "no" at block 512 among the plurality of computing devices. In particular, the readiness analyzer engine may repeat the steps recited in blocks 504 to 510 to re-determine readiness of the computing devices and the networking switches based on the connectivity among the plurality of computing devices via the plurality of networking switches.

At block 512, if the readiness analyzer engine determines that the other sub-report does not include test failed, i.e., "yes" at block 512, the method continues to block 514, where the readiness analyzer engine may generate a consolidated report (or report—combination of the sub-report and other sub-report) and provide the consolidated report based on the results of validation and results of the connectivity test, to the administrator. In such examples, the administrator may review the consolidated report and perform one or more steps for deploying the mission-critical system in the virtualized environment, as discussed in FIG. 1. The method 500 ends at block 516.

Various features as illustrated in the examples described herein may be implemented to perform pre-deployment activities, such as validating the datacenter environment for required configuration for deploying the mission-critical system, even before attempting an actual deployment of the mission-critical system in the virtualized environment. Accordingly, performing the pre-deployment activities may result in identifying configuration issues in the datacenter environment upfront, and fixing the identified configuration issues in the datacenter environment before the actual deployment. Thus, reducing the complexity during the actual deployment of the mission-critical system, and overall time spent on the actual deployment of the mission-critical system.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

We claim:

1. A method executed by a system comprising a hardware processor, comprising:
   receiving parameter data of a device controller, wherein the device controller manages deployment and configuration of a virtualized environment of a computing environment;
   receiving first configuration data of a plurality of computing devices in the computing environment;
   receiving second configuration data of a plurality of networking switches connected to the plurality of computing devices, wherein an indication of any incompatibility in a resource of a computing device of the plurality of computing devices or a protocol setting of a networking switch of the plurality of networking switches with predetermined compatibility criteria for deploying a fault-tolerant production system in the virtualized environment is based on the parameter data, the first configuration data, and the second configuration data;
   deploying virtual test-computing machines in respective computing devices of the plurality of computing devices;
   configuring network interfaces on the virtual test-computing machines to provide redundant connections through respective networking switches of the plurality of networking switches to achieve fault tolerance;
   performing a connectivity test among the plurality of computing devices based on triggering communications from the network interfaces on the virtual test-computing machines, the triggered communications comprising communications through the redundant connections; and
   based on the indication and a result of the connectivity test, deploying, using the device controller, the virtualized environment and the fault-tolerant production system in the virtualized environment.

2. The method of claim 1, wherein the triggered communications comprise pings from the network interfaces on the virtual test-computing machines.

3. The method of claim 1, wherein the indication indicates any incompatibility in a hardware resource or a firmware resource of a computing device.

4. The method of claim 1, wherein the device controller deploys virtualization software into computing devices of the fault-tolerant production system.

5. The method of claim 4, wherein the virtualization software deployed by the device controller into the computing devices of the fault-tolerant production system comprises a hypervisor.

6. The method of claim 1, wherein the first configuration data comprises at least one of hardware configuration data, network configuration data, or storage configuration data of each of the plurality of computing devices.

7. The method of claim 1, wherein the second configuration data comprises configuration information of network interfaces for one or more networking protocols in each of the plurality of networking switches.

8. The method of claim 1, wherein the parameter data comprises attributes of the device controller.

9. The method of claim 1, wherein:
   deploying the fault-tolerant production system in the virtualized environment is further based on a utility inventory.

10. The method of claim 1, wherein the system comprises at least one of a command line interface or a graphical user interface, and wherein the fault-tolerant production system comprises a mission-critical system.

11. A system comprising:
    a processor; and
    a non-transitory machine readable medium storing instructions executable on the processor to:
      receive parameter data of a device controller, wherein the device controller manages deployment and configuration of a virtualized environment of a computing environment;
      receive first configuration data of a plurality of computing devices in the computing environment;
      receive second configuration data of a plurality of networking switches connected to the plurality of computing devices, wherein an indication of any incompatibility in a resource of a computing device of the plurality of computing devices or a protocol setting of a networking switch of the plurality of networking switches with predetermined compatibility criteria for deploying a fault-tolerant production system in the virtualized environment is based on the parameter data, the first configuration data, and the second configuration data;
      deploy virtual test-computing machines in respective computing devices of the plurality of computing devices;
      configure network interfaces on the virtual test-computing machines to provide redundant connections through respective networking switches of the plurality of networking switches to achieve fault tolerance;
      perform a connectivity test among the plurality of computing devices based on triggering communications from the network interfaces on the virtual test-computing machines, the triggered communications comprising communications through the redundant connections; and
      based on the indication and results of the connectivity test, cause deployment, using the device controller, of the virtualized environment and the fault-tolerant production system in the virtualized environment.

12. The system of claim 11, wherein the triggered communications comprise pings from the network interfaces on the virtual test-computing machines.

13. The system of claim 11, wherein the indication indicates any incompatibility in a hardware resource or a firmware resource of a computing device.

14. The system of claim 11, wherein the device controller deploys virtualization software into computing devices of the fault-tolerant production system.

15. The system of claim 14, wherein the virtualization software deployed by the device controller into the computing devices of the fault-tolerant production system comprises a hypervisor.

16. The system of claim 11, wherein the first configuration data comprises at least one of hardware configuration data, network configuration data, or storage configuration data of each of the plurality of computing devices.

17. A non-transitory machine readable medium comprising instructions that upon execution cause a system to:
receive parameter data of a device controller, wherein the device controller manages deployment and configuration of a virtualized environment of a computing environment;
receive first configuration data of a plurality of computing devices in the computing environment;
receive second configuration data of a plurality of networking switches connected to the plurality of computing devices, wherein an indication of any incompatibility in a resource of a computing device of the plurality of computing devices or a protocol setting of a networking switch of the plurality of networking switches with predetermined compatibility criteria for deploying a fault-tolerant production system in the virtualized environment is based on the parameter data, the first configuration data, and the second configuration data;
deploy virtual test-computing machines in respective computing devices of the plurality of computing devices;
configure network interfaces on the virtual test-computing machines to provide redundant connections through respective networking switches of the plurality of networking switches to achieve fault tolerance;
perform a connectivity test among the plurality of computing devices based on triggering communications from the network interfaces on the virtual test-computing machines, the triggered communications comprising communications through the redundant connections; and
based on the indication and results of the connectivity test, cause deployment, using the device controller, of the virtualized environment and the fault-tolerant production system in the virtualized environment.

18. The non-transitory machine readable medium of claim 17, wherein the triggered communications comprise pings from the network interfaces on the virtual test-computing machines.

19. The non-transitory machine readable medium of claim 17, wherein the device controller deploys virtualization software into computing devices of the fault-tolerant production system.

20. The non-transitory machine readable medium of claim 19, wherein the virtualization software deployed by the device controller into the computing devices of the fault-tolerant production system comprises a hypervisor.

* * * * *